United States Patent [19]

Werlinger et al.

[11] Patent Number: 5,608,889
[45] Date of Patent: Mar. 4, 1997

[54] DNA CONTROLLER WITH WRAP-AROUND BUFFER MODE

[75] Inventors: Larry M. Werlinger, Burnsville; James A. Dahlberg, Eagan; Kermit E. Frye, Bloomington, all of Minn.

[73] Assignee: Ceridian Corporation, Minneapolis, Minn.

[21] Appl. No.: 292,339

[22] Filed: Aug. 17, 1994

[51] Int. Cl.⁶ ............................ G06F 11/00; G11C 7/00
[52] U.S. Cl. ........................ 395/421.07; 395/497.01; 395/846
[58] Field of Search ........................ 395/842, 846, 395/486, 497.01, 421.07, 421.09

[56] References Cited

U.S. PATENT DOCUMENTS

| | | |
|---|---|---|
| 5,056,010 | 10/1991 | Huang . |
| 5,083,269 | 1/1992 | Syobatake et al. . |
| 5,167,020 | 11/1992 | Kahn et al. . |
| 5,175,818 | 12/1992 | Kunimoto et al. . |
| 5,175,819 | 12/1992 | Le Ngoc et al. . |
| 5,179,661 | 1/1993 | Copeland, III et al. . |
| 5,179,662 | 1/1993 | Corrigan et al. . |

Primary Examiner—Jack B. Harvey
Assistant Examiner—Jeffrey K. Seto
Attorney, Agent, or Firm—Kinney & Lange

[57] ABSTRACT

A direct memory access (DMA) controller having a first mode and a second mode controls communication between a module bus, communicating with a processor and a memory, and an input/output (I/O) bus communicating with an external device. A data controller subsystem stores I/O bus input data to provide module bus output data, and stores module bus input data to provide I/O bus output data. A device address controller subsystem stores a device address from the module bus to provide an I/O device output address to the I/O bus for addressing the external device. A memory addressing subsystem receives module bus input data to form an initial memory address provided to the module bus representing a storage location in the memory. An incrementer increments the initial memory address. In the second mode, the incrementer restarts the memory address at the initial memory address after incrementing the memory address a selected number of addresses above the initial memory address to form a wrap-around buffer in the memory. A transfer counter calculates a transfer count representing the number of selected data groupings of the I/O bus output data written into the memory. A detector detects when the transfer count reaches a selected value indicating that a normal DMA operation is complete in the first mode and detects when the wrap-around buffer in the memory is full based on the transfer count in the second mode.

22 Claims, 6 Drawing Sheets

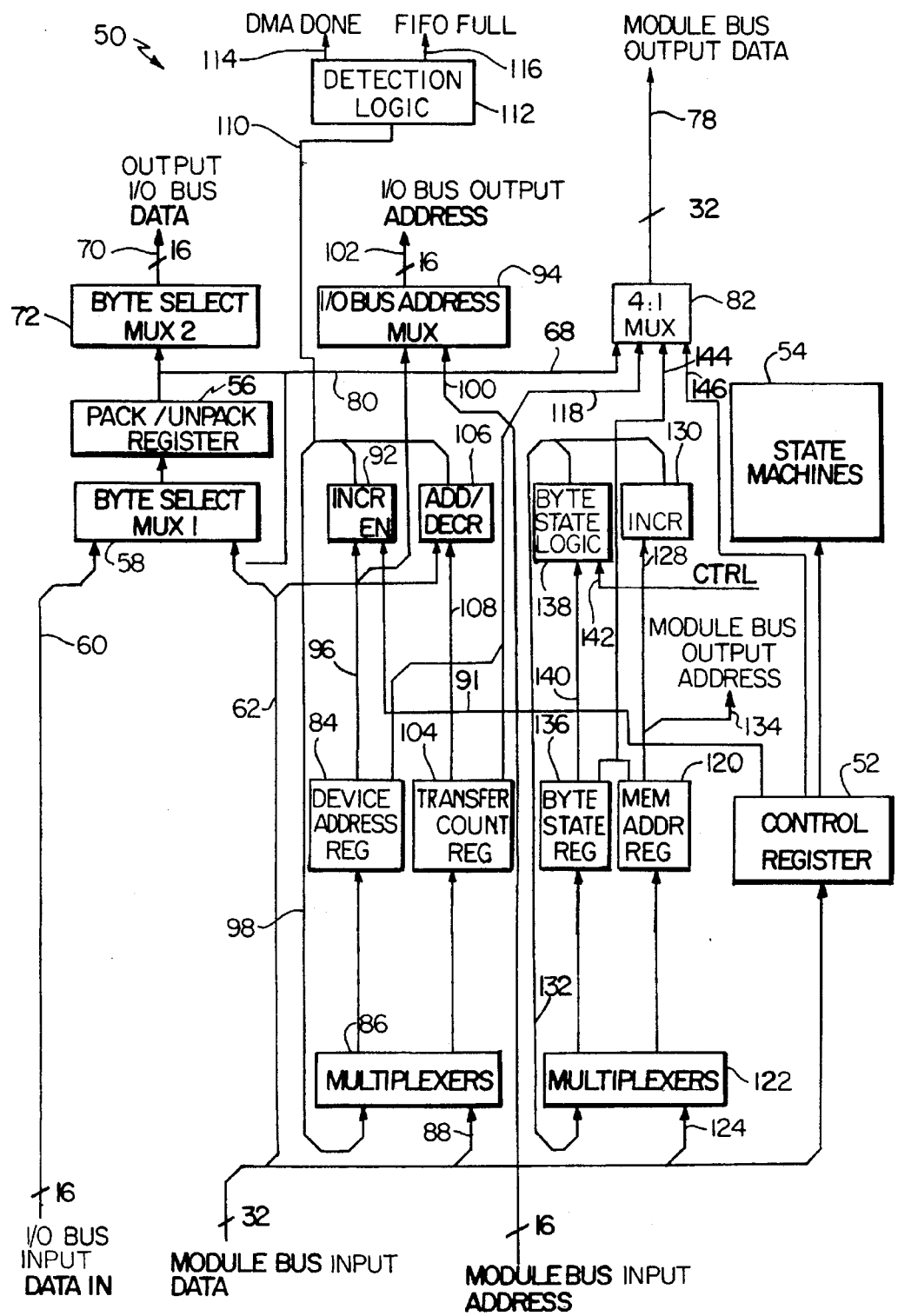
Fig. 2 SINGLE CHANNEL DMA BLOCK DIAGRAM

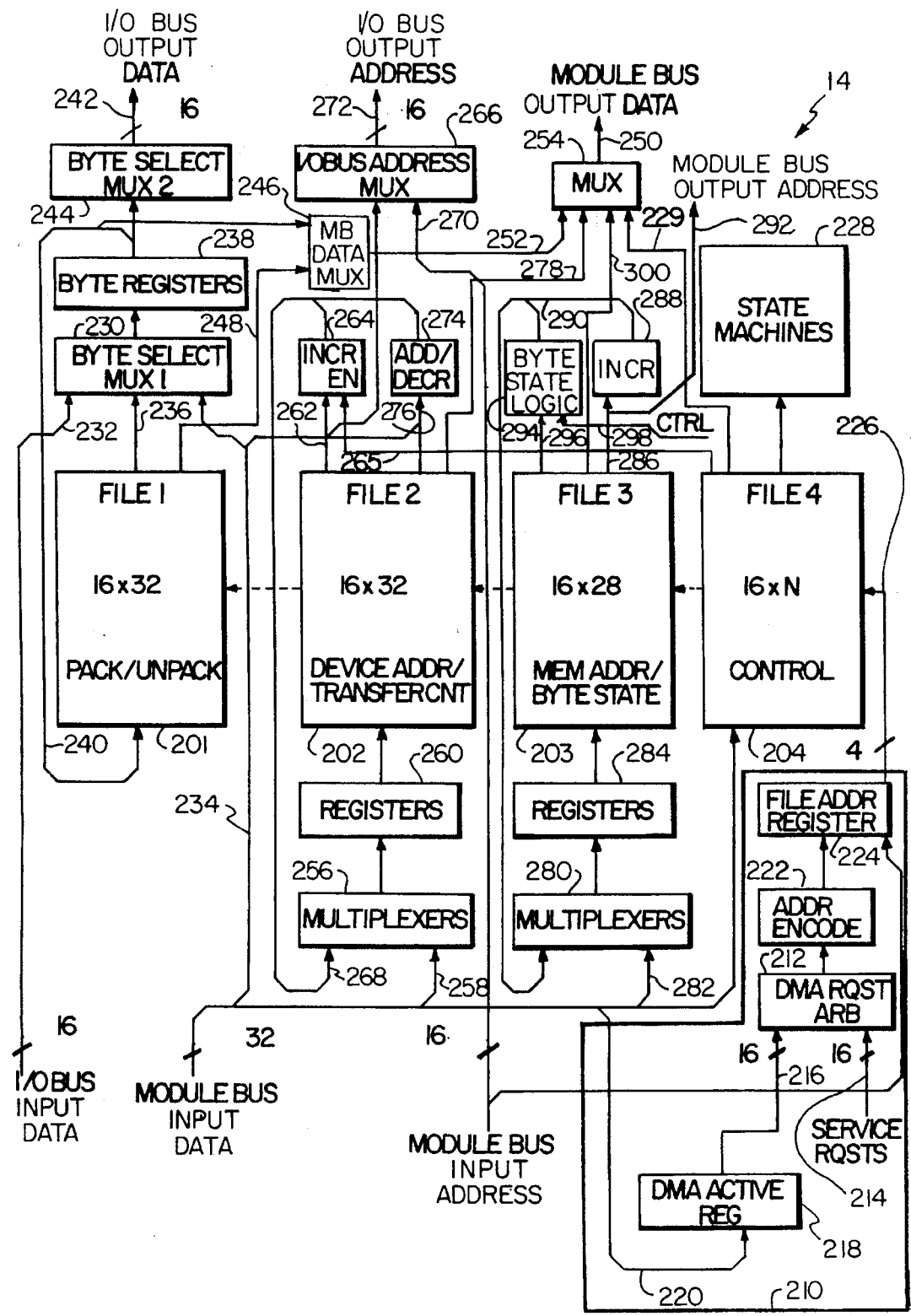
Fig. 3  16 CHANNEL DMA BLOCK DIAGRAM

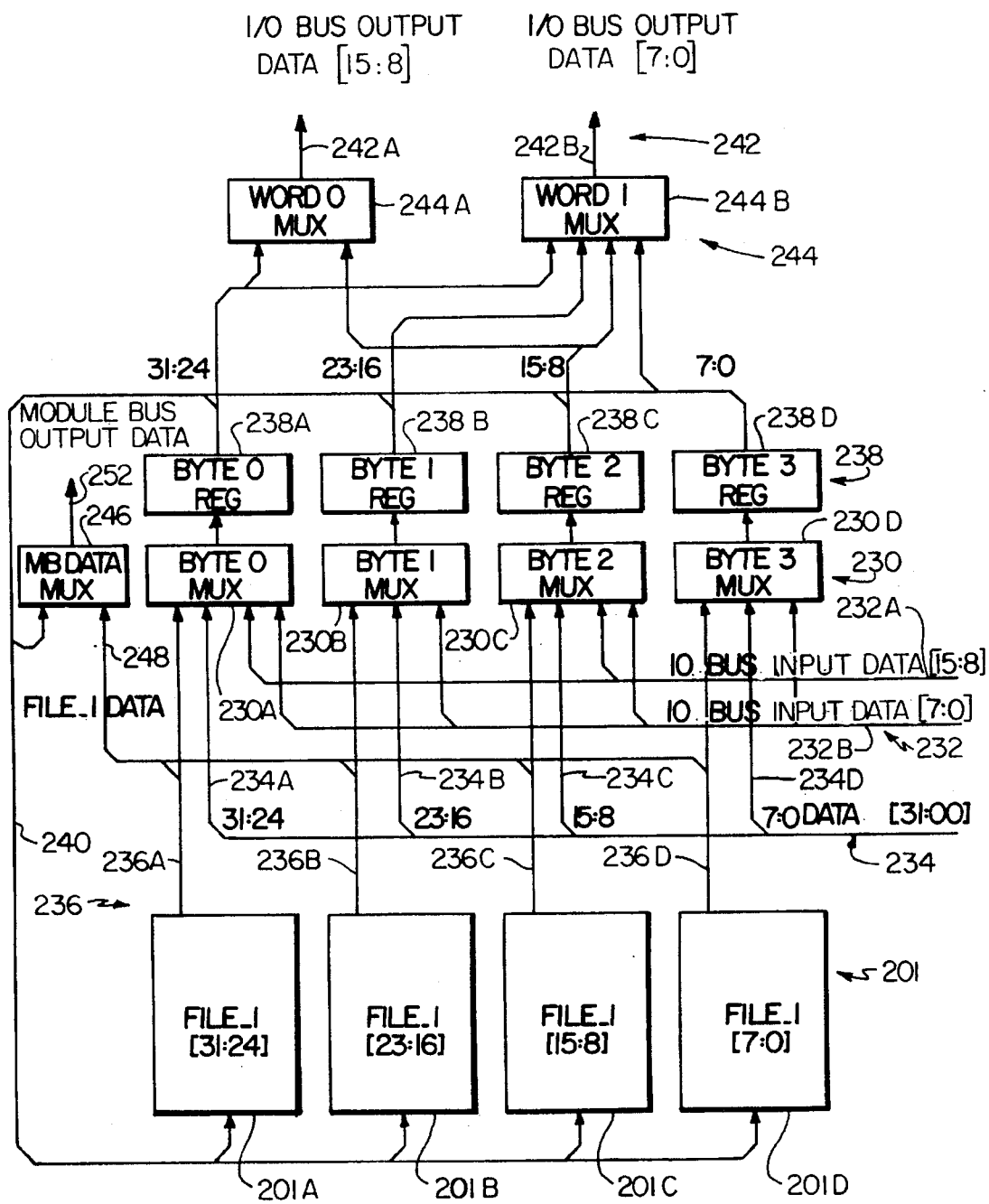
Fig. 4    FILE I DESIGN

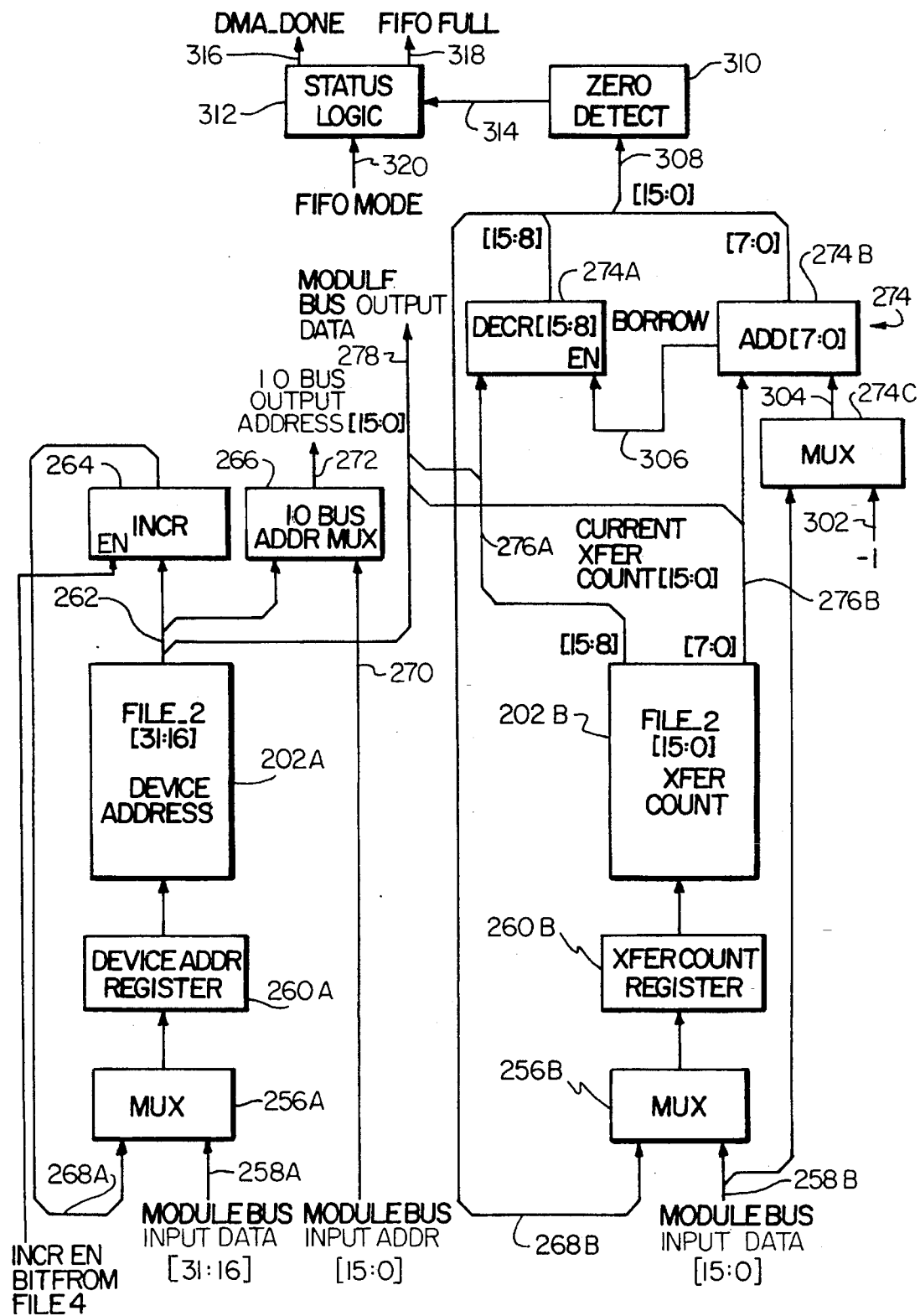
Fig. 5  FILE 2 DESIGN

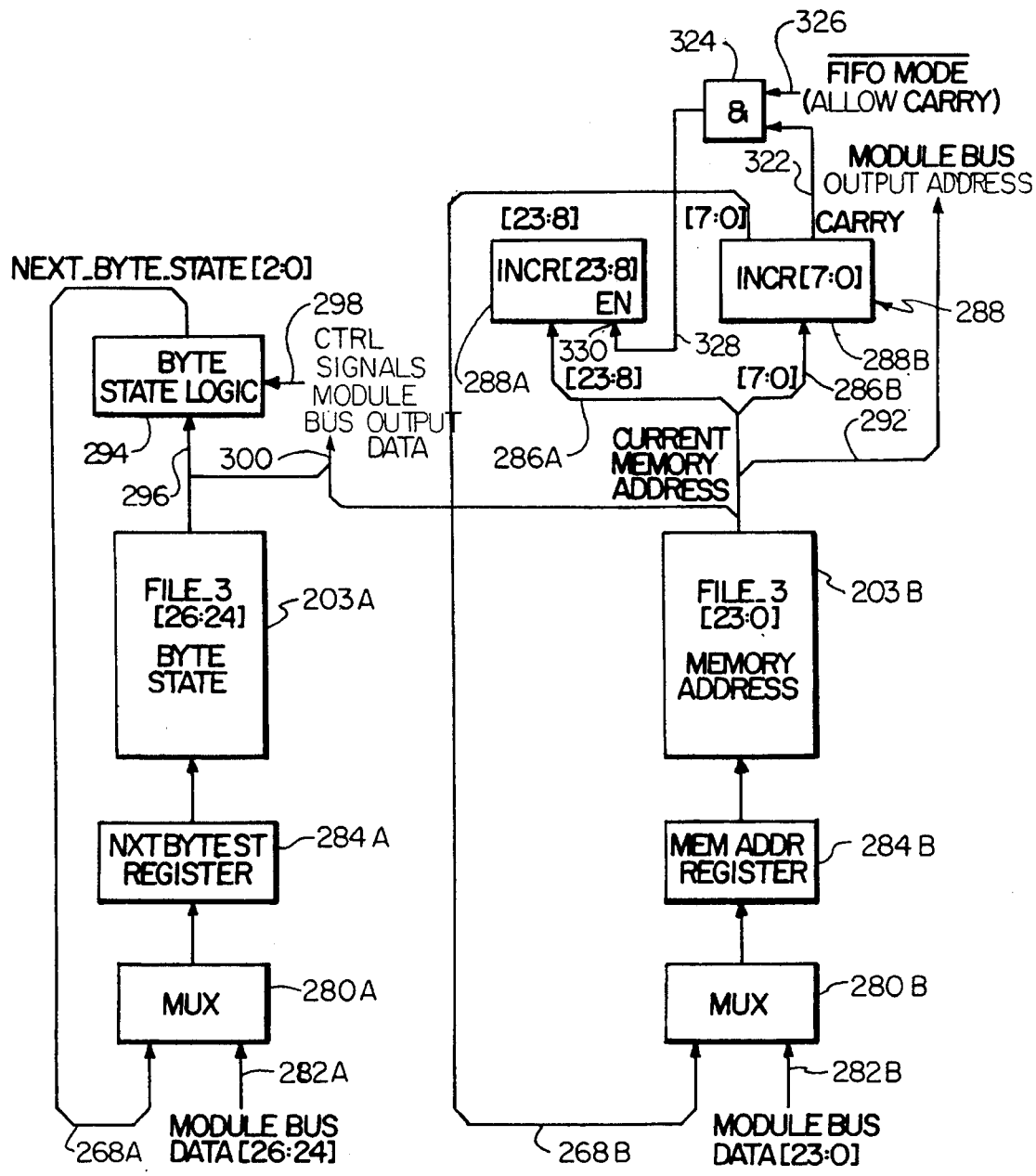
Fig. 6    FILE 3 DESIGN

DNA CONTROLLER WITH WRAP-AROUND BUFFER MODE

BACKGROUND OF THE INVENTION

The present invention relates generally to direct memory access (DMA) controllers, and in particular, to DMA controllers for use with external interfaces.

DMA controllers are used for controlling the communication between external devices and a processor and memory. The DMA controller can control direct memory access to and from external serial devices such as those serial devices serviced by RS232, RS422, and RS485 serial interfaces. The DMA controller controls the parallel data communication between a module bus, which communicates with the processor and the memory, and an input/output (I/O) bus, which communicates with serial devices. Since the DMA controller provides parallel data on the I/O bus, a universal asynchronous receiver/transmitter (UART) is typically coupled between the I/O bus and the serial device to provide translation between serial data provided by the serial device and parallel data provided by the DMA controller on the I/O bus. The UART is a standard component used to receive data from and transmit data to a serial device from a parallel data bus.

Input data received by a UART from a serial device will be lost in a system not using a DMA controller if the input data is not read by the processor before the next byte of data arrives. To solve this problem, many UARTs contain a first in-first out (FIFO) buffer. The FIFO buffer provides additional storage for the input data provided by a serial device to make room for the next byte of data until the processor, in the absence of a DMA controller, is free to read the data from the serial device. However, the processor needs to be interrupted to read the data from the UART's FIFO and transfer it to main memory. Thus, DMA controllers are commonly utilized in computer systems comprising a plurality of UARTs, because DMA controllers write input data directly to the processor's memory without interrupting the processor. Therefore, the DMA controller in effect acts to expand the storage of input data from a serial device before the input data is actually processed by the processor. Another reason that DMA controllers are used in computer systems comprising UARTs is that DMA controllers switch from one active UART device to another active UART device in significantly less time than if the software that operates the processor controls the switching between the UART devices because of the time overhead of software operations as compared to hardware logic gates used in the DMA controller.

As mentioned above, the UART usually includes a FIFO buffer memory for storing serial device input data that has been translated into parallel form data by the UART. Typically, the FIFO is 16 bytes deep. A problem exists in using the 16 byte deep FIFO in a multi-tasking software environment because several tasks can be active at the same time, and additional tasks are activated when the processor is interrupted. The FIFO needs to be capable of storing more than 16 bytes to guarantee that no data will be lost during the delays and added processing times arising in this multi-tasking environment. Since a single processor typically performs operations with respect to a single task at a time, software controlling the processor implements a time division multiplexed and/or priority multiplexed scheme. In such multiplexing schemes, the software controls the processor to allow the processor to process one task for a selected amount of time or until a higher priority task request is received. In either case, the software saves the state of the current task and switches to the next task in time or to a higher priority task. If many tasks are active, or if a few high priority tasks are active, some tasks are not revisited for further processing by the processor for a relatively long time. In addition, as the number of active tasks increases, or when more high-priority tasks are active, the delay from one processing of a particular task to the next processing of the same task can increase significantly. If this delay from one processing to the next processing is too long, the FIFO buffer will lose data associated with some I/O tasks if the FIFO is not deep enough.

DMA controllers typically comprise three main control registers, a transfer length register, a source address register, and a destination address register. A different source address is associated with each of the serial devices. A destination address represents the address of the initial memory storage location for storing a grouping of serial device input data in the memory of the computer. A transfer length represents the total number of bytes to be transferred during a selected DMA operation. Thus, destination addresses along with corresponding transfer lengths define the destination locations in the processor s memory where various input data groupings are to be stored.

One typical application of a DMA controller is to connect the processor to a terminal having a keyboard as a serial source. In this application, the processor evaluates input data one character at a time. Another typical application of a DMA controller is to connect the processor to a serial channel which utilizes a higher level protocol such as one accommodating block transfers of a number of bytes. These bytes may include the destination address, commands, packet length data, and the like. In addition, the packets can be of variable length.

Currently, problems exist when using DMA controllers in both of the above applications. Existing DMA controllers define where to place a grouping of serial device input data based solely on a starting address stored in the destination address register and a defined transfer length stored in the transfer length register. Thus, when the processor initiates a conventional DMA operation, the processor is not informed of the receipt of any data from the serial channel until the number of bytes indicated by the defined transfer length are received indicating that the particular DMA operation is finished. However, a transfer length cannot be defined for data arriving from a keyboard because the processor does not know how many characters will be arriving. In addition, many protocols accommodating block transfers have data packets with variable packet lengths and existing DMA controllers cannot change the transfer length to adapt to the variable packet lengths because DMA controllers have defined transfer lengths. In both of these situations, the processor does not know that it has data in its memory that it should be processing.

SUMMARY OF THE INVENTION

The present invention relates to a dual mode direct memory access (DMA) controller for controlling communication between a module bus and an input/output (I/O) bus. The module bus communicates with a processor and a memory. The I/O bus communicates with an external device. The DMA controller includes a mode controller subsystem for providing a mode bit having a first state and a second state. A data controller subsystem receives and selectively stores I/O bus input data from the I/O bus to provide module bus output data to the module bus. The data controller subsystem also receives and selectively stores module bus input data from the module bus to provide I/O bus output data to the I/O bus. A device address controller subsystem receives and selectively stores a device address tom the module bus to provide an I/O device output address to the I/O bus. The device address represents the external device. A memory addressing subsystem stores and provides a memory address to the module bus representing a storage location in the memory. The memory addressing subsystem receives module bus input data to form an initial memory address. The memory addressing subsystem includes an incrementer for repeatedly incrementing by at least one count the memory address from the initial memory address through a selected range of memory addresses representing a grouping of storage locations. The memory addressing subsystem is responsive to the mode bit being in the second state to restart the memory address at the initial memory address after the incrementer has incremented the memory address a selected number of addresses above the initial memory address to cause the memory address to wrap around at the initial memory address to thereby form a wrap-around buffer in the memory. A transfer counter calculates and stores a transfer count representing the number of selected data groupings of the module bus output data written into the memory from the module bus. A detector detects when the transfer count stored in the transfer count storage logic has reached a selected value to indicate when a normal DMA operation of storing module bus output data to memory is complete in response to the mode bit being in the first state. The detector also detects when the wrap-around buffer in the memory is full based on the transfer count to signal an error condition in response to the mode bit being in the second state.

In a preferred embodiment of the DMA controller according to the present invention, the I/O bus communicates with a universal asynchronous receiver/transmitter (UART) to receive data from and transmit data to a serial device. The UART provides translation between serial data provided by the serial device and parallel data provided by the I/O bus. Optionally, the DMA controller controls a plurality of UARTs to receive data from and transmit data to a plurality of serial devices. When the DMA controller communicates with a plurality of serial devices, the data controller subsystem, the device address controller subsystem, the transfer counter, the memory addressing subsystem, and the mode controller subsystem are preferably implemented in a register file structure. An arbitrator selects a serial device to match a channel which corresponds to a register file address.

In the preferred embodiment of the present invention, the data controller subsystem further includes packing logic for packing I/O bus input data and module bus input data into words having at least two bytes in response to the mode bit being in the first state. The packing logic holds a byte in response to the mode bit being in the second state.

Processor software preferably uses the wrap-around buffer formed in the memory in response to the mode bit being in the second state as a first in first out (FIFO) buffer. The transfer counter preferably modifies the transfer count based on a number of selected data groupings read from the wrap-around buffer in the memory in response to the mode bit being in the second state. In addition, the detector preferably detects when a selected amount of data is written in the wrap-around buffer in the memory to indicate an interrupt condition in response to the mode bit being in the second state.

BRIEF DESCRIPTION OF THE DRAWINGS

FIG. 2 is a block diagram of a single channel dual mode DMA controller according to the present invention.

FIG. 3 is a block diagram of a 16-channel dual mode DMA controller according to the present invention.

FIG. 4 is a block diagram of a register file structure containing data storage logic and pack/unpack logic for the DMA controller of FIG. 3.

FIG. 5 is a block diagram of a register file structure containing device address logic and transfer count logic for the DMA controller of FIG. 3.

FIG. 6 is a block diagram of a register file structure containing byte state logic and memory address logic of the DMA controller of FIG. 3.

DETAILED DESCRIPTION OF THE PREFERRED EMBODIMENTS

Figure 1:
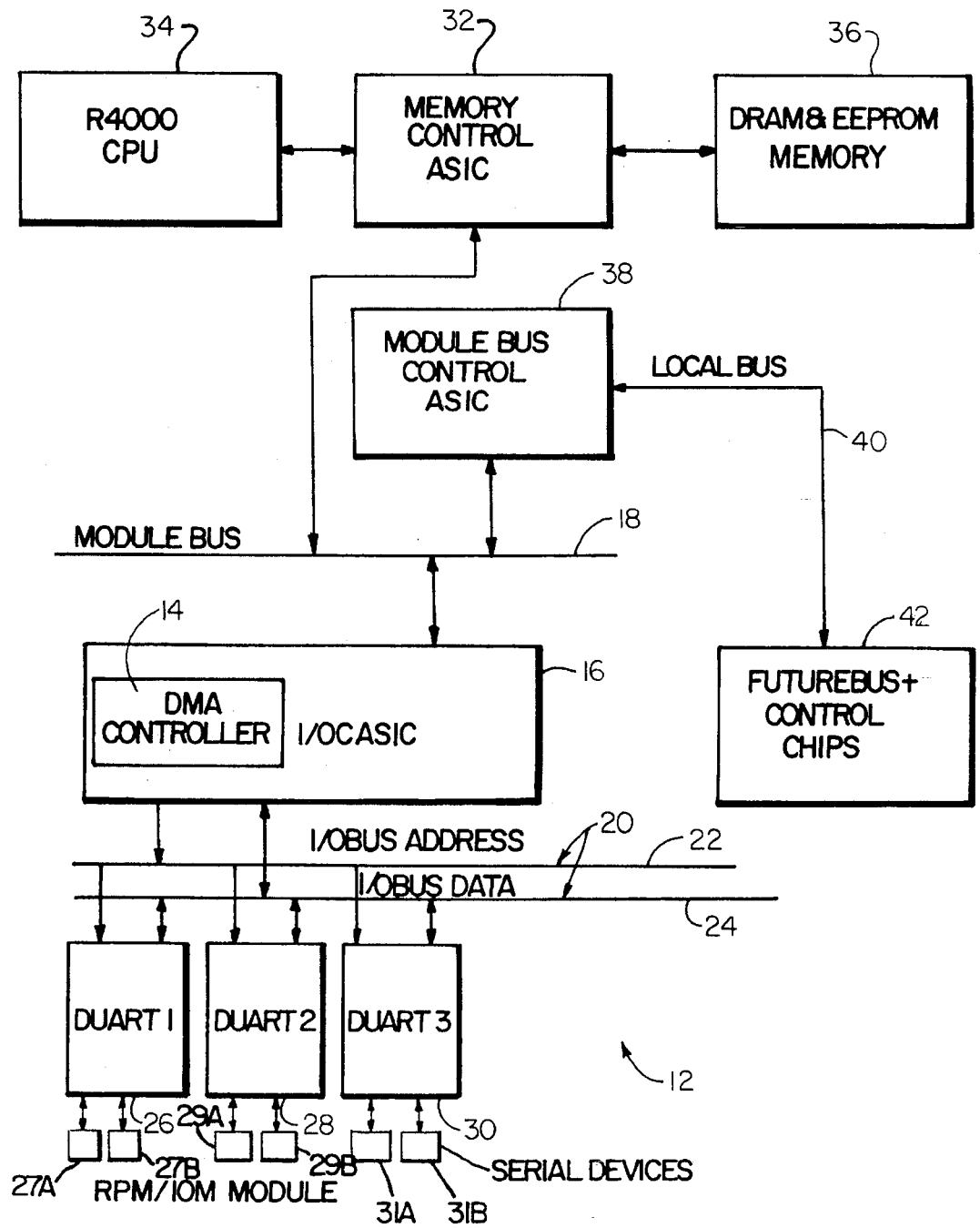
FIG. 1 is a block diagram of a RISC processor module incorporating a dual mode DMA controller according to the present invention.

A RISC processor module (RPM) or input/output module (I/OM), designated by the number 12, is generally illustrated in block diagram form in FIG. 1. RPM 12 comprises a dual mode DMA controller 14 according to the present invention operating in either a conventional mode or a buffered mode. DMA controller 14 is implemented in an input/output control (I/OC) application specific integrated circuit (ASIC) logic chip 16. DMA controller 14 and other logic in the I/OC chip 16 control the parallel data communication between a module bus 18 and an input/output (I/O) bus 20.

I/O bus 20 comprises an I/O address bus 22 and an I/O data bus 24. As illustrated, I/O bus 20 communicates with three dual UARTS (DUARTs) 26, 28, and 30. DUARTs 26, 28, and 30 each comprise two universal asynchronous receiver/transmitters (UART) to receive data from, and transmit data to, serial devices 27A, 27B, 29A, 29B, 31A, and 31B. The UARTs each provide translation between serial data provided and accepted by the corresponding serial device and parallel data provided and accepted by the I/O bus. UARTs are a standard component and are manufactured by various companies. A suitable UART is packaged in pairs and sold as the Signetics 2692 DUART. Since each DUART has two UARTs and each UART has a receive and transmit channel, the three DUARTs 26, 28, and 30 provide 12 channels to communicate with the six serial devices. Typically, the three DUARTs implement six RS422 full duplex channels to permit simultaneous transmitting to and receiving from to service six serial devices. I/O bus 20 can also communicate with other external devices (not shown) such as parallel data devices or memory devices.

Module bus 18 communicates with a memory control ASIC chip 32. Memory control ASIC chip 32 communicates with a central processing unit (CPU) 34. CPU 34 is implemented as a MIPS RISC1 R4000 processor chip. Memory control chip 32 also communicates with a memory 36. Memory 36 is implemented with DRAM and EEPROM memory chips. A module bus control ASIC chip 38 controls module bus 18. Module bus control ASIC chip 38 communicates with a local bus 40. Local bus 40 communicates with a bus operated under the FUTURE BUS + protocol and other control chips indicated at 42.

Dual mode DMA controller 14 is illustrated in more detail in the block diagram form shown in FIG. 3. Dual mode DMA controller 14 is implemented with a register file based system or "architecture". The register file based architecture permits storing of 16 words in each of four specific purpose files, with each word corresponding to a single communication channel. An external device is assigned to an associated channel word storage arrangement in the register file architecture through the control of an arbitration logic structure 210 in DMA controller 14, Thus, the register file based architecture of DMA controller 14 supports 16 I/O bus communication channels which include the 12 serial channels used to communicate with DUARTs 26, 28, and 30 of FIG. 1. In addition, two communication channels operated under the PROTEUS protocol and two memory-to-memory channels are supported by DMA controller 14. The present invention may be implemented without this register file architecture. Nevertheless, the register file structure of DMA controller 14 is an efficient architecture for multiple channel DMA controllers because the supporting logic structure for each file does not have to be reproduced for each channel.

A simplified embodiment of the present invention is represented in a dual mode DMA controller 50 supporting a single channel which is generally illustrated in FIG. 2. Dual mode single channel DMA controller 50 incorporates the features of the present invention without the register file structure of DMA controller 14 illustrated in FIG. 3. The more complex file architecture of 16 channel DMA controller 14 is subsequently described below.

Dual mode, single channel DMA controller 50 includes a control register 52. Control register 52 stores control bits provided from CPU 34 which control the states of various logic subsystems used in DMA controller 50. Examples of typical control bits stored in control register 52 are a bit to determine if DMA controller 50 is controlling an 8 or 16 bit channel, and a bit or bits to control channel timing information to allow programmable wait states to accommodate various I/O devices. In-addition, in this single channel DMA controller, a bit is necessary to distinguish between input data and output data being transmitted over that single channel. The bit to distinguish between input and output data would not be necessary if DMA controller 50 was a two-channel DMA controller having one channel operating to receive and control input data and one channel operating to transmit and control output data.

An additional control bit is necessary to select between the two modes of operation of the DMA controller. In the first mode of operation, the DMA controller functions as a conventional DMA controller. The second mode of operation permits the DMA controller to create a first in first out (FIFO) buffer in memory 36 for storing data arriving from an external device. Essentially, a wrap-around buffer employed in memory 36 by the DMA controller is utilized by software operating processor 34 to extend the effective size of the FIFO buffer already existing in the UARTs through the DMA controller recirculating the addresses of the memory buffer storage locations. The control bits stored in control register 52 are provided to finite state machines 54. State machines 54 place corresponding logic systems or subsystems in the DMA controller in desired logic states as dictated by the control bits of control register 52. For clarity, most of the control lines between state machines 54 and these systems or subsystems are not shown in the block diagrams.

A data storage register, or pack/unpack register 56, stores both I/O bus input data from I/O bus 20 and module bus input data from module bus 18. As indicated in FIG. 2, a byte select multiplexer 58 receives I/O bus input data on line 60 and module bus input data on line 62. An external device provides data to be sent to CPU 34 or stored in memory 36 as byte, or half-word, data through the input channel on line 60 as I/O bus input data. Examples of sources of input data are characters from a keyboard to be sent to CPU 34 or a number of bytes provided in a block transfer from a serial device to memory 36. State machines 54 control the logic state of select lines (not shown) to byte select multiplexer 58 to activate line 60 to thereby position the input bytes or half words on line 60 from the I/O bus input data to correctly pack the bytes with bytes already stored in pack/unpack register 56. The output of byte select multiplexer 58 is provided to pack/unpack register 56.

When data is provided to an external device, such as during block transfers from memory 36 to a serial device, CPU 34 commands DMA controller 50 to control data read from memory 36 to be delivered to the external device. The data read from memory 36 is first provided as module bus input data on line 62 to byte select multiplexer 58. State machines 54 control the logic state of the select lines to byte select multiplexer 58 to activate line 62 to thereby provide the module bus input data from the memory on line 62 to pack/unpack register 56. Pack/unpack register 56 holds the output byte or half word from byte select multiplexer 58 and provides its output to a byte-select multiplexer 72. State machines 54 control the logic state of select lines (not shown) to byte select multiplexer 72 to thereby position bytes properly for byte-wide channels and to provide the bytes to I/O bus 20 as I/O bus output data on line 70.

A 4:1 multiplexer 82 receives the output of pack/unpack register 56 on line 68. State machines 54 control the logic state of select lines (not shown) to 4:1 multiplexer 82 to thereby select the packed data for processor 34 to read as module bus output data on line 78 to module bus 18.

A device address register 84 stores a corresponding device address obtained from module bus 18 representing that external device currently in communication with DMA controller 50. Typically, the device address addresses an input or output data register in the UART corresponding to a serial device. Multiplexers 86 receive module bus input data on line 88. A device address portion of the output of multiplexer 86 is received by device address register 84. Device address register 84 supplies a device address on line 96 to an incrementer 92 and an I/O bus address multiplexer 94. An increment enable bit from control register 52 is provided to incrementer 92 on line 91 to control an optional incrementing function of incrementer 92. When the increment enable bit on line 91 is active incrementer 92 increments by one count the device address, considered as a binary number, after each output transfer from device address register 84. When DMA controller 50 is controlling the communication with a serial device via a UART, the increment enable bit is inactive because the device address only addresses one input or output data register in the UART corresponding to one serial device. By contrast, when DMA controller 50 is controlling the communication with a memory device, the increment enable bit is active because the device address needs to address multiple storage locations in the memory device.

The output of incrementer 92 is provided to a second input of multiplexers 86 on line 98. State machines 54 control the logic state of select lines (not shown) to multiplexers 86 to activate input line 98 when DMA controller 50 has written a byte or half-word to the external device. The I/O bus address multiplexer 94 receives the device address output from device address register 84 on line 96 for a DMA operation or the module bus input address on line 100 for a CPU 34 operation. State machines 54 control the logic state of select lines (not shown) to I/O bus address multiplexer 94 to thereby activate either line 96 or line 100 to provide an I/O bus output address, representing the currently active external device, on line 102 to I/O address bus 22. Line 100 provides a direct module bus input address, typically from processor 34, thereby bypassing device address register 84 and its associated logic.

A transfer count register 104 stores a transfer count representing the number of bytes or half words to be transferred to or from I/O bus 20 of the module bus output data written into memory 36 from module bus 18. An output of transfer count register 104 provides the current transfer count to a functional unit 106 on line 108. Functional unit 106 decrements the transfer count during operation of DMA controller 50 in both the conventional DMA mode and the FIFO buffer mode. In addition, in the FIFO buffer mode, the current value of the transfer count provided on line 108 can be added to a value provided by the software operating processor 34. The software determined value is equal to the number of bytes read from the FIFO buffer formed in memory 36. Thus, the processor software reads transfer count register 104 to determine how many bytes are valid in the FIFO buffer in main memory 36 and then provides that value as module bus input data on line 62 to functional unit 106. The output of functional unit 106 represents the new transfer count and is provided on line 98 to multiplexers 86. Multiplexers 86 receive an initial transfer count on line 88 via the module bus input data from module bus 18. State machines 54 control the logic state of select lines (not shown) to multiplexers 86 to thereby activate either line 98 carrying the new transfer count or line 88 carrying the initial transfer count to provide the next transfer count to transfer count register 104.

Functional unit 106 provides the updated transfer count on line 110 to detection logic 112. For DMA controller 50 operating in conventional DMA mode, detection logic 112 detects an all zeros condition when functional unit 106 decrements the transfer count to all zeros. This detection of all zeros activates a $DMA_{13}$ DONE signal on line 114 to indicate that the DMA operation is finished. The number of bytes indicated by a transfer count of all ones represents a transfer length or the total number of bytes to be transferred during a selected DMA operation. Thus, a transfer count of 16 bits being set to all ones indicates the initiation of a DMA operation having a 64K byte transfer length representing the total number of bytes to be transferred during a selected DMA operation. The all ones transfer count of 16 bits being decremented to an all zeros transfer count by functional unit 106 indicates the completion of the DMA operation with the 64K byte transfer length.

If an all zeros condition occurs for DMA controller 50 operations in FIFO buffer mode, detection logic 112 provides a FIFO FULL signal on line 116 to indicate an error condition. In FIFO buffer mode, detection logic 112 activates the $DMA_{13}$ DONE signal on line 114 either when the FIFO buffer in memory 36 is half full or when one or more bytes are stored in the FIFO buffer depending on the logic state of a control bit in control register 52. Just how functional unit 106 performs the adding and decrementing functions during both the conventional DMA mode and the FIFO buffer mode is representatively illustrated and described in more detail in connection with FIG. 5 below in reference to DMA controller 14.

A memory address register 120 contains a memory address which represents a storage location in main memory 36 of processor 34 to which data is written during an input operation, or from which data is read during an output operation. Multiplexers 122 receive module bus input data representing the initial memory address on input line 124. Initially, state machines 54 control the logic state of select lines (not shown) to multiplexers 122 to activate input line 124 to thereby provide the initial memory address on line 124 to memory address register 120 which registers the memory address. Memory address register 120 provides the current memory address on line 128 to an incrementer 130. Incrementer 130 increments by one count the memory address, considered as a binary number, to point to the next memory address to be read or written during a conventional DMA operation. Incrementer 130 provides an incremented memory address on line 132 to multiplexers 122. Thus, as incrementer 130 increments the memory address, state machines 54 control the logic state of the select lines to multiplexers 122 to activate input line 132 to thereby provide the incremented memory address to memory address register 120. The current memory address is provided as module bus output address on line 134 to module bus 18.

The memory address binary number in incrementer 130 is split into an upper multiple bit portion and a lower multiple bit portion. An overflow carry on a carry line between the lower multiple bit portion and the upper multiple bit portion, resulting from sufficiently incrementing the lower multiple bit portion, results in the upper multiple bit portion being incremented if enabled by an inverted FIFO buffer mode signal. Blocking logic in incrementer 130 blocks the carry from the lower multiple bit portion in response to the mode bit in control register 52 being in the FIFO buffer mode state. Thus, the upper multiple bit portion is inhibited from being incremented during the FIFO buffer mode by effectively forcing the carry line from the lower multiple bit portion to a nonactive state. This blocking of the carry into the upper multiple bit portion causes the memory address provided on line 134 to restart from the initial address supplied by processor 34, or wrap around, to thereby form the wraparound buffer in main memory 36. In a preferred embodiment of the invention, the lower multiple bit portion of the memory address in incrementer 130 is eight bits which creates a FIFO buffer which wraps around within a 256 byte memory region. During the conventional DMA mode operation, the carry from the lower bit portion is allowed to propagate to the upper bit portion. The operation of incrementer 130 is representatively illustrated and described in more detail in connection with FIG. 6 below in reference to DMA controller 14.

A byte state register 136 stores and holds the state of the current byte position to control, as described in the following, the packing and unpacking of byte and half-word data in the pack/unpack register 56, as described above. A portion of the module bus input data provides the necessary information for the initial byte state on line 124 to multiplexers 122. A byte state portion of the output of multiplexers 122 is provided to byte state register 136. Byte state logic 138 receives the current byte state from byte state register 136 on line 140. Control bits to control the byte state are provided to byte state logic 138 on line 142 from finite state machines 54. A portion of line 132 is dedicated to transferring the byte state provided by byte state logic 138 to the second input of multiplexers 122. After the initial byte state is determined, state machines 54 control the logic state of the select lines to multiplexers 122 to activate the dedicated portion of line 132 to thereby transfer the new byte state to byte state register 136.

The contents of device address register 84 and the contents of transfer count register 104 are provided on line 118 to 4:1 multiplexer 82. State machines 54 control the logic state of select lines (not shown) to 4:1 multiplexer 82 to activate input line 118 to thereby provide the contents of either device address register 84 or the contents of transfer count register 104 on line 78 as module bus output data to module bus 18. Similarly, the contents of memory address register 120 and byte state register 136 are provided on line 144 to 4:1 multiplexer 82. State machines 54 control the logic state of the select lines to 4:1 multiplexer 82 to activate input line 144 to thereby provide the contents of either memory address register 120 or the contents of byte state register 136 on line 78 as module bus output data to module bus 18. The contents of control register 52 are also provided to 4:1 multiplexer 82 via line 146. State machines 54 control the logic state of the select lines to 4:1 multiplexer 82 to activate input line 146 to thereby provide the contents of control register 52 on line 78 as module bus output data to module bus 18. In this way, processor 34 is able to read the contents of device address register 84, the contents of transfer count register 104, memory address register 120, byte state register 136, and control register 52. Diagnostic software operating processor 34 uses the contents of these registers to recreate conditions that existed when certain error conditions occurred in the processor. In addition, as explained above, a path is provided from pack/unpack register 56 to line 68 to 4:1 multiplexer 82 to provide processor 34 a path for reading the contents of pack/unpack register 56.

Thus, DMA controller 50 comprises various logic subsystems to control data transferred between an external device and CPU 34 or memory 36. A state and mode controller subsystem includes control register 52 and state machines 54 to control the states of the other logic subsystems and to place DMA controller 50 in either the conventional DMA controller mode or the FIFO buffer mode. A data controller subsystem including pack/unpack register 56 and its supporting logic structure handles the actual data being transfer between the external device and CPU 34 or memory 36. A device address controller subsystem including device address register 84 and its supporting logic structure handles the device address representing that external device currently in communication with DMA controller 50. A transfer counter including transfer count register 104 and its supporting logic structure keeps track of the number bytes transferred to or from I/O bus 20 to the module bus output data written into memory 36 from module bus 18 during transfers from the external device to memory 36. A Memory addressing subsystem including memory address register 120 and its supporting logic structure provides the memory address representing a storage location in memory 36 to which data is written during an input operation, or from which data is read during an output operation. A detector including detection logic 112 detects when the DMA transfer operation is finished.

DMA controller 50 controlling characters arriving from a keyboard provides an illustrative example of the DMA controller operating in the FIFO buffer mode for a transfer from a serial device to CPU 34 or memory 36. Here, the characters from the keyboard are provided to the data controller subsystem on I/O data bus 24. The data controller subsystem provides the characters on module bus 18 as module bus output data. Since CPU 34 can only process one character at a time from the keyboard, the characters on module bus 18 are stored in the FIFO buffer formed in memory 36.

This FIFO buffer is formed by the memory addressing subsystem which receives the initial memory address, representing the first storage location in memory 36 which the keyboard characters are to be written, on module bus 18 as module bus input data. The memory addressing subsystem repeatedly increments by one count the memory address as the characters arrive from the keyboard to address additional memory storage locations. After incrementing the memory address a selected number of addresses above the initial memory address, the memory addressing subsystem responds to the mode bit from the state and mode controller subsystem being in the FIFO buffer mode to restart the memory address at the initial memory address, which forms the FIFO buffer in memory 36 which stores the keyboard characters so the characters will not be lost.

The transfer counter keeps track of the number of bytes of the keyboard characters written into memory 36 from module bus 18 by decrementing the transfer count. Detection logic 112 detects if the FIFO buffer is full based on the transfer count. When CPU 34 reads keyboard characters from memory 36 to process the characters, the software operating CPU 34 determines the number of bytes of keyboard characters read from memory 36. This number of bytes is added back into the transfer count to provide an updated transfer count representing the number of bytes of keyboard characters that have not yet been processed by CPU 34 stored in the FIFO buffer formed in memory 36.

Referring to FIG. 3, dual mode DMA controller 14 utilizes a register file architecture to communicate with six serial devices over six RS422 full duplex channels, and to communicate over two communication channels operating under the PROTEUS protocol along with communicating over two memory-to-memory channels. DMA controller 14 can be easily configured to communicate with other external devices such as parallel data devices or memory devices. Both a receive and a transmit channel are dedicated to each external device thereby providing full duplex communication to accommodate block transfer data formats. Dual mode DMA controller 14 comprises four register files each of which can store 16 words, one for each channel of up to 32 bits in the embodiment illustrated in FIG. 3. A pack/unpack data file 201 can also store 16 words of 32 bits. A device address/block transfer count data file 202 can similarly store 16 words of 32 bits. A byte state/memory address data file 203 again can store 16 words but of only 28 bits. A channel enable and control file 204 is capable of storing 16 words of 16 bits. As mentioned above, the present invention is not limited to DMA controllers implemented with this register file architecture, as illustrated with the single channel DMA controller 50 embodiment of FIG. 2. However, the register file structure in the system described below is preferably used for multiple channel DMA controllers because of the efficiency of the register file structure where the supporting logic structure for each file does not have to be reproduced for each channel.

DMA controller 14 includes an arbitrator, or arbitration logic structure, 210 to control the granting of an assignment of an external device to an associated channel word storage arrangement in the register file architecture. Arbitration logic structure 210 includes DMA request arbitration logic system 212 which receives service requests provided on line 214 from the external I/O channels. DMA request arbitration logic system 212 qualifies the service requests from the external I/O channels with DMA active bits which are provided on line 216 from DMA active register 218. DMA active bits are provided to DMA active register 218 on line 220 as module bus input data tom module bus 18. DMA request arbitration logic system 212 selects one of the service requests, and so the external device, to be granted an assignment to one of the channel word storage arrangements and the associated logic system in the register file architecture to thereby remain in communication therethrough during the duration of the assignment. The output of DMA request arbitration logic system 212 is provided to address encode logic system 222. Address encode logic system 222 encodes the selected request from DMA request arbitration logic system 212 to form an address for words in the register files used in this register file architecture to form the assignment made. The encoded address from address encode logic system 222 is provided to a file address register 224 which stores the encoded address. The encoded address stored in file address register 224 is provided on line 226 and represents the assigned word storage locations in each of the corresponding four register files which will contain the information for, and the data from or to, the I/O channel between DMA controller 14 and the external device granted the channel assignment.

Channel enable and control register file 204 stores control bits provided from CPU 34 which control the states of the other register files and the various associated logic systems used in DMA controller 14. File 204 also stores the channel enable bits from arbitration logic structure 210. Examples of typical control bits stored in control file 204 are a bit to determine if DMA controller 14 is controlling an 8 bit or 16 bit channel, and a bit or bits to control channel timing information to allow programmable wait states to accommodate various I/O devices. In addition, a control bit is necessary to select between the two modes of operation of the DMA controller. As with DMA controller 50, in the first mode of operation, DMA controller 14 functions as a conventional DMA controller. The second mode of operation permits DMA controller 14 to create a FIFO buffer in memory 36 for storing data arriving from an external device. The FIFO buffer is a wrap-around buffer in memory 36 employed by DMA controller 14 and utilized by software operating processor 34 to extend the effective size of the FIFO buffer already existing in the UARTs through the controller recirculating the address of the memory buffer storage locations. The control bits stored in control file 204 are provided to finite state machines 228. State machines 228 place corresponding logic systems or subsystems in desired logic states as dictated by the control bits of control file 204.

The contents of channel enable and control file 204 are provided on line 229 to a 4:1 multiplexer 254. State machines 228 control the logic state of select lines (not shown) to 4:1 multiplexer 254 to activate input line 229 to thereby provide the contents of control file 204 on line 250 as module bus output data to module bus 18. In this way, processor 34 is able to read the contents of control file 204 so diagnostic software operating that processor can recreate conditions that existed when certain error conditions occurred in the processor.

Pack/unpack data register file 201 stores both I/O bus input data from I/O bus 20 and module bus input data from module bus 18. A byte select multiplexer 230 receives I/O bus input data on line 232, module bus input data on line 234, and an output of pack/unpack file 201 on line 236. An external device provides input data to be sent to CPU 34 or stored in memory 36 as byte, or half-word, data through an input channel on line 232 as I/O bus input data. State machines 228 control the logic state of select lines (not shown) to byte select multiplexer 230 to activate line 232 to thereby position the input bytes or half words from the I/O bus input data to correctly pack the bytes with bytes already stored in pack/unpack file 201. The output of byte select multiplexer 230 is provided to a byte register 238. Byte register 238 stores the bytes or half words for subsequent writing back into pack/unpack data file 201 via line 240.

When data is provided to an external device, such as during block transfers from memory 36 to a serial device, CPU 34 commands DMA controller 14 to control data read from memory 36 to be delivered to the external device. The data read from memory 36 is first provided as module bus input data on line 234 to byte select multiplexer 230. State machines 228 control the logic state of the select lines to byte select multiplexer 230 to activate line 234 to thereby provide the module bus input data from the memory to byte register 238 which provides the data to pack/unpack data file 201 via line 240. State machines 228 then change the logic state of the select lines to byte select multiplexer 230 to activate line 236 to thereby provide the pack/unpack register output as I/O bus output data on line 242. Byte register 238 holds the output byte or half word from byte select multiplexer 230 and provides its output to a byte select multiplexer 244. State machines 228 control the logic state of select lines (not shown) to byte select multiplexer 244 to thereby position bytes properly for byte-wide channels and provides the bytes on line 242 as I/O bus output data.

A module bus data multiplexer 246 receives the output of byte registers 238 on line 240 and the packed file data from pack/unpack date file 201 on line 248. State machines 228 control the logic state of select lines (not shown) to multiplexer 246 to thereby select either the packed file data for the processor to read or the data stored in the byte registers to be provided as module bus output data on line 250 to module bus 18. The output of module bus data multiplexer 246 is provided on line 252 to 4:1 multiplexer 254. 4:1 multiplexer 254 provides the module output data on line 250.

Device address/block transfer count data file 202 stores a corresponding device address obtained from module bus 18 representing that external device currently in communication with DMA controller 14 after being granted an assignment to, and so access to, a corresponding channel in the four register files. Typically, the device address addresses an input or output data register in the UART corresponding to a serial device. Multiplexers 256 receive module bus input data on line 258. The output of multiplexers 256 is received by registers 260. A portion of the output of registers 260 is received by the device address portion of data file 202. Data file 202 supplies a device address on line 262 to an incrementer 264 and an I/O bus address multiplexer 266. An increment enable bit from control file 204 is provided to incrementer 264 on line 265 to control an optional incrementing function of incrementer 264. When the increment enable bit on line 91 is active incrementer 264 increments by one count the device address, considered as a binary number, after each output transfer from the device address portion of data file 202. When DMA controller 14 is controlling the communication with a serial device via a UART, the increment enable bit is inactive because the device address only addresses one input or output data register in the UART corresponding to one serial device. By contrast, when DMA controller 14 is controlling the communication with a memory device, the increment enable bit is active because the device address needs to address multiple storage locations in the memory device.

The output of incrementer 264 is provided to a second input of multiplexers 256 on line 268. State machines 228 control the logic state of select lines (not shown) to multiplexers 256 to activate input line 268 when DMA controller 14 has written a byte, or half word, to the active external device. Registers 260 hold the initial device address from processor 34 via the module bus input data on line 258, or the current device address after optional incrementing, for writing into the device address portion of data file 202. I/O bus address multiplexer 266 receives the device address output from the device address portion of data file 202 on line 262 and the module bus input address on line 270. State machines 228 control the logic state of select lines (not shown) to I/O bus address multiplexer 266 to thereby activate either line 262 or line 270 to provide the I/O bus output address on line 272 to I/O address bus 22 as the device address. Line 270 provides a direct module bus input address, typically from processor 34, thereby bypassing the device address portion of data register file 202 and its associated logic systems.

Device address/block transfer count data file 202 also stores a transfer count representing the number of bytes of the module bus output data written into memory 36 from module bus 18. An output of the transfer count portion of data file 202 provides the current transfer count to a functional unit 274 on line 276. Functional unit 274 decrements the transfer count during operation of DMA controller 14 in both the conventional DMA mode and the FIFO buffer mode. In addition, in the FIFO buffer mode, the current value of the transfer count provided on line 276 can be added to a value provided on line 234 by software operating processor 34. The software determined value is equal to the number of bytes read from the FIFO buffer formed in memory 36. Thus, the processor software reads the transfer count portion of data file 202 to determine how many bytes are valid in the FIFO buffer in main memory 36 and then provides that value as module bus input data on line 234 to functional unit 274. The output of functional unit 274 represents the new transfer count and is provided on line 268 to multiplexers 256. Multiplexers 256 receive an initial transfer count on line 258 via the module bus input data from module bus 18. State machines 228 control the logic state of the select lines to multiplexers 256 to thereby activate either line 268 carrying the new transfer count or line 258 carrying the initial transfer count to provide the next transfer count to registers 260, which provide the transfer count to the transfer count portion of data file 202. A more detailed discussion of the adding and decrementing functions of functional unit 274 during both the conventional DMA mode and the FIFO buffer mode is described in more detail below in reference to FIG. 5 along with a description of the utilization of the transfer count to provide a DMA_DONE signal and a FIFO FULL signal.

The contents of device address/block transfer count data file 202 is provided on line 278 to 4:1 multiplexer 254. State machines 228 control the logic state of the select lines to 4:1 multiplexer 254 to activate input line 278 to thereby provide the contents of the device address portion and the transfer count portion of data file 202 on line 250 as module bus output data to module bus 18. In this way, processor 34 is able to read the contents of device address/block transfer count data file 202 to be used by software to determine how many transfers occurred between the I/O device and DMA controller 14.

Byte state/memory address data file 203 contains a memory address which represents a storage location in main memory 36 of processor 34 to which data is written during an input operation, or from which data is read during an output operation. Multiplexers 280 receive module bus input data representing the initial memory address on input line 282. Initially, state machines 228 control the logic state of select lines (not shown) to multiplexers 280 to activate input line 282 to thereby provide the starting memory address to registers 284 which register the memory address. The memory address portion of data file 203 receives a memory address for a storage location in main memory 36 from registers 284. The memory address portion of data file 203 provides the current memory address on line 286 to an incrementer 288. Incrementer 288 increments by one count (byte transfers) or two counts (half word transfers) the memory address, considered as a binary number, to point to the next memory address to be read or written during a conventional DMA operation. Incrementer 288 provides an incremented memory address on line 290 to multiplexers 280. Thus, as incrementer 288 increments the memory address, state machines 228 control the logic state of the select lines to multiplexers 280 to activate input line 290 to thereby provide the incremented memory address to registers 284, which register the memory address and provide the incremented address to the memory address portion of data file 203. The current memory address is provided as module output address on line 292 to module bus 18. The operation of incrementer 288 is illustrated and described in more detail in reference to FIG. 6 below.

Byte state/memory address data file 203 also stores and holds the state of the current byte position to control the packing and unpacking of byte and half-word data in the pack/unpack data file 201. A portion of the module bus input data provides the necessary information for the initial byte state on line 282 to multiplexers 280. The output of multiplexers 280 is provided to registers 284. A portion of registers 284 provide a current byte state to the byte state portion of data file 203. Byte state logic 294 receives the current byte state from the byte state portion of data file 203 on line 296. Control bits to control the byte state are provided to byte state logic 294 on line 298 from finite state machines 228. A portion of line 290 is dedicated to transferring the byte state provided by byte state logic 294 to the second input of multiplexers 280. After the initial byte state is determined, state machines 228 control the logic state of the select lines to multiplexers 280 to activate the dedicated portion of line 290 to thereby transfer the new byte state to registers 284 which provide the current byte state to the byte state portion of data file 203.

The contents of byte state/memory address data file 203 are provided on line 300 to 4:1 multiplexer 254. State machines 228 control the logic state of the select lines to 4:1 multiplexer 254 to activate input line 300 to thereby provide either the memory address portion or the byte state portion of data file 203 on line 250 as module bus output data to module bus 18. In this way, processor 34 is able to read the contents of byte state/memory address data file 203 to be used by diagnostic software operating the processor to recreate conditions that existed when certain error conditions occurred in the processor.

The register file structure of pack/unpack data file 201 is illustrated in more detail in FIG. 4. Pack/unpack data file 201 is divided into four file portions which are each one byte wide. File portion 201A contains bits 31:24 (byte 0) of the data. File portion 201B contains bits 23:16 (byte 1) of the data. File portion 201C contains bits 15:8 (byte 2) of the data. File portion 201D contains bits 7:0 (byte 3) of the data. Byte select multiplexer 230 is correspondingly divided into four byte sections corresponding to the four file portions of data file 201. Multiplexer portion 230A corresponds to byte 0, multiplexer portion 230B corresponds to byte 1, multiplexer portion 230C corresponds to byte 2, and multiplexer portion 230D corresponds to byte 3. I/O bus input data [15:8] is provided to multiplexer portions 230A and 230C via line 232A. I/O bus input data [7:0] is provided to multiplexer portions 230A, 230B, 230C, and 230D via line 232B. Module bus input data [31:24] is provided to multiplexer portion 230A on input line 234A. Module bus input data [23:16] is provided to multiplexer portion 230B on input line 234B. Module bus input data [15:8] is provided to multiplexer portion 230C on input line 234C. Module bus input data [7:0] is provided to multiplexer portion 230D on input line 234D. The output of data file portion 201A is provided to multiplexer portion 230A on line 236A. The output of data file portion 201B is provided to multiplexer portion 230B on line 236B. The output of data file portion 201C is provided to multiplexer portion 230C on line 236C. The output of data file portion 201D is provided to multiplexer portion 230D on line 236D.

When DMA controller 14 is receiving input data from an external device, byte select multiplexer 230 receives byte, or half-word, data from the input channel on lines 232A and 232B as I/O bus input data. State machines 228 control the logic state of the select lines to byte select multiplexer 230 to thereby position the input bytes, or half words, from the I/O bus input data to correctly pack the bytes or half words with bytes already stored in data file 201. The byte 0 output of multiplexer portion 230A is provided to byte 0 register 238A. The byte 1 output of multiplexer portion 230B is provided to byte 1 register 238B. The byte 2 output of multiplexer portion 230C is provided to byte 2 register 238C. The byte 3 output of multiplexer portion 230D is provided to byte 3 register 238D. Byte registers 238A, 238B, 238C, and 238D store the bytes, or half words, for subsequent writing back into the corresponding data files 201 A, 201B, 201C, and 201D respectfully via line 240.

When CPU 34 commands to DMA controller 14 control data read from memory 36 to be delivered to an external device, the data read from memory 36 is first provided as module bus input data on lines 234A, 234B, 234C, and 234D to byte select multiplexer portions 230A, 230B, 230C, and 230D. State machines 228 control the logic state of the select lines to byte select multiplexer 234 to activate lines 234A, 234B, 234C, and 234D to thereby provide the module bus input data from memory 36 to byte register 238 which holds the data for subsequent writing into data file 201. State machines 228 then change the logic state of the select lines to byte select multiplexer portions 230A, 230B, 230C, and 230D to thereby select the outputs from data file portions 201A, 201B, 201C, and 201D respectively on activated lines 236A, 236B, 236C, and 236D to be provided as I/O bus output data on lines 242A and 242B. Byte register 238 holds the output byte, or half word, from byte select multiplexer 230 and provides its output to word 0 byte select multiplexer 244A and word 1 byte select multiplexer 244B. State machines 228 control the logic state of the select lines to word 0 multiplexer 244A to thereby select between byte 0 data from byte 0 register 238A and byte 2 data from byte 2 register 238C to provide I/O bus output data [15:8] on line 242A. State machines 228 control the logic state of the select lines to word 1 multiplexer 244B to thereby select between byte 0 data from byte 0 register 238A, byte 1 data from byte 1 register 238B, byte 2 data from byte 2 register 238C, and byte 3 data from byte 3 register 238D to provide I/O bus output data [7:0] on line 242B.

Module bus data multiplexer 246 receives the output of byte register 238 on line 240 and the packed file data from data file 201 on line 248. State machines 228 control the logic state of the select lines to module bus data multiplexer 246 to thereby select the data stored in the byte register 238 to be provided as module bus output data on line 252 when DMA controller 14 is operating in the DMA mode. State machines 228 control the logic state of the select lines to module bus data multiplexer 246 to thereby select line 248 to enable processor 34 to read the packed file data when certain error conditions occur in the processor so diagnostic software operating the processor can recreate conditions that existed when the errors occurred.

FIG. 5 illustrates the device address/block transfer count data file 202 in more detail. Device address file portion 202A of data file 202 stores the device address obtained from module bus 18 representing that external device currently in communication with DMA controller 14. Multiplexer portion 256A receives module bus input data [31:16] on line 258A. The output of multiplexer portion 256A is received by device address register 260A. The output of device address register 260A is received by device address file portion 202A. Device address file portion 202A supplies a device address on line 262 to incrementer 264 and I/O bus address multiplexer 266. Incrementer 264 optionally increments by one count the device address, considered as a binary number, after each output transfer from device address file portion 202A depending on the logic state of the increment enable bit on line 265 from control file 204. The output of incrementer 264 is provided to multiplexer portion 256A on line 268A. Input line 268A of multiplexer portion 256A is activated by state machines 228 when DMA controller 14 has written a byte, or half word, to an external device. Device address register 260A holds the optionally incremented device address, or the initial device address, from the processor via the module bus input data on line 258A for writing into device address file portion 202A. The I/O bus address multiplexer 266 receives the device address output from device address file portion 202A on line 262 and the module bus input address on line 270. State machines 228 control the logic state of the select lines to I/O bus address multiplexer 266 to activate either line 262 or line 270 to provide the I/O bus output address on line 272 as I/O bus output address [15:0]. As mentioned above, line 270 provides a direct module bus input address [15:0], typically from processor 34, thereby bypassing device address file portion 202A and its associated logic.

Transfer count file portion 202B of data file 202 stores the transfer count representing the number of transfers on I/O bus 20, to or from memory 36 via module bus 18. Functional unit 274 is divided into a decrementer 274A, an adder 274B, and a multiplexer 274C. Decrementer 274A handles the transfer count upper bits 15:8 and adder 274B handles the transfer count lower bits 7:0. Transfer count [15:8] representing the upper bits of the current transfer count are provided to decrementer 274A on line 276A. Transfer count [7:0] representing the lower bits of the current transfer count are provided to adder 274B on line 276B. During operation of DMA controller 14 in the conventional DMA mode, state machines 228 control the logic state of the select lines to multiplexer 274C to thereby select a minus one input on line 302 and provides a minus one input to adder 274B on line 304 to effectively cause adder 274B to decrement transfer count [7:0] by adding a minus one to the current transfer count provided on line 276B. In addition, during operation of DMA controller 14 in the FIFO buffer mode, the minus 1 input on line 302 of multiplexer 274C is activated by state machines 228 to provide a minus one input on line 304 to adder 274B to effectively cause adder 274B to decrement. In addition, software operating processor 34 reads transfer count file portion 202B to determine how many bytes are valid in the FIFO buffer formed in memory 36 and then provides that value as module bus input data on line 258B to multiplexer 274C. The software determined value is equal to the number of bytes read from the FIFO buffer in memory 36. Thus, in the FIFO buffer mode, the current value of the transfer count provided on line 276B is added to the software determined value provided on line 258B when the 258B input of multiplexer 274C is activated by state machines 228 to provide the software determined value on line 304 to adder 274B. Adder 274B then adds the software determined value to the current transfer count value provided on line 276B.

A borrow resulting from an overflow condition in adder 274B is provided from adder 274B to decrementer 274A on line 306 to enable decrementer 274A to decrement. The combined outputs of decrementer 274A and adder 274B represent the new or updated transfer count and are provided on line 268B to multiplexer portion 256B. Multiplexer portion 256B receives the initial transfer count on line 258B via the module bus input data from module bus 18. State machines 228 control the logic state of the select lines to multiplexer portion 256B to thereby select between the updated transfer count and the initial transfer count to provide the next transfer count to transfer count register 260B, which provides the transfer count to transfer count file portion 202B.

The combined outputs of decrementer 274A and adder 274B are provided as updated transfer count [15:0] on line 308 to zero detect logic 310. During operation of DMA controller 14 in either the conventional DMA mode or the FIFO buffer mode, zero detection logic 310 detects an all zeros condition when adder 274B and decrementer 274A decrement transfer count [15:0] to all zeros. This detection of all zeros is provided to status logic 312 on line 314. During operation of DMA controller 14 in the conventional DMA mode, the detection of the all zeros condition activates a $DMA_{13}$ DONE signal on line 316 to indicate that the DMA operation is finished which sets a DMA complete interrupt. Thus, transfer count [15:0] being set to all ones indicates the initiation of a DMA operation having a 64K byte transfer length representing the total number of bytes to be transferred during a selected DMA operation. The all ones transfer count [15:0] being decremented to an all zeros transfer count by adder 274B and decrementer 274A indicates the completion of the DMA operation with the 64K byte transfer length.

If an all zeros condition is indicated on line 314 during operation of DMA controller 14 in the FIFO buffer mode, status logic 312 provides a FIFO FULL signal on line 318 to indicate an error condition. A FIFO mode signal is provided on line 320 to status logic 312 to indicate whether DMA controller 14 is operating in the conventional DMA mode or in the FIFO buffer mode. The FIFO mode bit provided on line 320 is stored in control file 204.

When DMA controller 14 is operating the FIFO buffer mode, all byte transfers are sent directly to memory 36 as partial word, or byte writes, and the DMA destination address is incremented by one count. The DMA complete interrupt is typically set with each byte that is sent to memory 36. Alternatively, the DMA complete interrupt is set when the FIFO buffer formed in memory 36 is half full. The selection of which FIFO mode DMA complete interrupt to generate is determined by a configuration bit in control file 204. As explained above, during operation of DMA controller 14 in the conventional DMA mode, the DMA complete interrupt is set only when the byte transfer count reaches all zeros to activate the $DMA_{13}$ DONE signal on line 316.

As explained above, the contents of device address file portion 202A and the contents of transfer count file portion 202B are provided on line 278 to provide a path for processor 34 to read the contents of data file 202 for use by diagnostic software operating the processor.

Byte state/memory address data file 203 is illustrated in more detail in FIG. 6. Byte state file portion 203A of data file 203 holds bits [26:24] representing the state of the current byte position to control the packing and unpacking of byte and half word data in pack/unpack data file 201. Module bus input data [26:24] provides the necessary information for the initial byte state on line 282A to multiplexer portion 280A. The output of multiplexer portion is provided to next byte state register 284A. Next byte state register 284A provides the current byte state to byte state file portion 203A. Byte state logic 294 receives the current byte state from byte state file portion 203A on line 296. Control bits to control the byte state are provided to byte state logic 294 on line 298 from finite state machines 228. Byte state logic 294 provides the byte state to multiplexer portion 280A on line 268A. After the initial byte state is determined, multiplexers 280A select line 268A to transfer the new byte state to next byte state register 284A which provides the current byte state to byte state file portion 203A.

Memory address file portion 203B of data file 203 contains the memory address in bits [23:0], which represents the storage location in main memory 36 where data is written during an input operation or from which data is read during an output operation. Multiplexer portion 280B receives module bus input data [23:0] representing the initial memory address on input line 282B. Initially, state machines 228 control the logic state of the select lines to multiplexer portion 280B to activate input line 282B to thereby select the initial memory address which is registered in memory address register 284B, which provides the memory address to memory address file portion 203B. Memory address file portion 203B provides the current memory address on line 292 to module bus 18 as the module bus output address. The upper bits [23:8] of the memory address from memory address file portion 203B are provided on line 286A to upper multiple bit portion 288A of incrementer 288. The lower bits [7:0] of the memory address from memory address file portion 203B are provided on line 286B to lower multiple bit portion 288B of incrementer 288.

An overflow carry resulting from sufficiently incrementing lower multiple bit portion 288B is provided on line 322 to an AND gate 324. An allow carry signal is provided on line 326 as a second input to AND gate 324. The allow carry signal on line 326 is active during operation of DMA controller 14 in the conventional DMA mode and inactive during operation of DMA controller 14 in the FIFO buffer mode. The output of AND gate 324 is provided on line 328 to an enable input 330 of upper multiple bit portion 288A of incrementer 288. Thus, during operation of DMA controller 14 in the conventional DMA mode, the carry from lower multiple bit portion 288B is propagated to upper multiple bit portion 288A by AND gate 324 which results in upper multiple bit portion 288A being incremented. By contrast, during operation of DMA controller 14 in the FIFO buffer mode, the allow carry signal on line 326 blocks the carry on line 322 from propagating through AND gate 324. Thus, upper multiple bit portion 288A is inhibited from incrementing during operation of DMA controller 14 in the FIFO buffer mode by effectively forcing line 328 to a nonactive state to disable enable input 330 of upper multiple bit portion 288A. This blocking of the carry into upper multiple bit portion 288A causes the memory address provided on line 292 to restart from the initial address supplied by processor 34, or wrap around, to thereby form the wrap-around buffer in main memory 36. In the preferred embodiment of the invention illustrated in FIG. 6, lower multiple bit portion 288B of incrementer 288 increments eight bits of the memory address which creates a FIFO buffer in memory 36 which wraps around within a 256 byte memory region.

Incrementer portions 288A and 288B provide the incremented memory address on line 268B to multiplexer portion 280B. Thus, as incrementer 288 increments the memory address, state machines 228 control the logic state of the select lines to multiplexer portion 280B to activate input line 268B to thereby provide the incremented memory address to memory address register 284B. Memory address register 284B provides this incremented memory address to memory address file portion 203B.

To utilize the wrap-around buffer formed in memory 36 of processor 34 as a true FIFO buffer, software operating processor 34 must keep track of the top of the FIFO buffer and when the buffer wraps around or rolls over. To accomplish these tasks, software operating processor 34 reads the DMA memory address stored in memory address file portion 203 B and the byte transfer count stored in byte transfer count file portion 202B. The DMA memory address points to the bottom of the FIFO buffer, or in other words, the initial memory address. The number of bytes currently stored in the wrap-around memory buffer is equal to 256 minus the byte transfer count.

Thus, when DMA controller 14 is operating in the FIFO buffer mode, software operating processor 34 reads the byte transfer count to ascertain the number of valid bytes saved in the FIFO buffer formed in memory 36. After the software has read this number of bytes of data from the FIFO buffer, the software provides this number to adder 274B as module bus input data to be added back into the byte transfer count. The software operating processor 34 accomplishes this task by writing the number of bytes it read from the FIFO buffer in memory 36 to a special address associated with the byte transfer count file portion 202B. If the byte transfer count ever goes to zeros during the operation of DMA controller 14 in the FIFO buffer mode, a FIFO FULL condition exists indicating an error condition which sets a channel error interrupt and clears a DMA active flip flop. This error condition signal prevents over writing of data in the FIFO buffer in memory 36.

During the operation of the DMA controller according to the present invention, such as illustrated by DMA controller 14 and DMA controller 50, in the conventional DMA mode, the DMA controller has a defined transfer length, the DMA operation is initiated by processor 34, and processor 34 is not informed of the receipt of any data from the active external device until the transfer count is decremented to all zeros to indicate that the DMA operation is finished because the number of bytes represented by the transfer length have been received. As explained above, the DMA controller operating in the conventional DMA mode defines where a grouping of external device input data is to be stored in memory 36 simply by specifying the starting destination address and the transfer length. The DMA controller operating in the conventional DMA mode does not accommodate data arriving from a keyboard because processor 34 cannot determine the number of characters arriving from the keyboard so the transfer length is not definable. In addition, the DMA controller operating in the conventional DMA mode does not accommodate higher level protocols accommodating block transfers having data packets with variable packet lengths, because, while Operating in the conventional DMA 0 mode, the DMA controller has a defined transfer length which does not change to adapt to the variable packet lengths. In both of these serial input data cases, a situation can arise where processor 34 does not know that it has data in memory 36 that processor 34 should be processing.

The dual mode DMA controller according to the present invention has the FIFO buffer mode which allows the DMA controller to form a FIFO buffer in memory 36 of processor 34 for storing data arriving from the active external device. In this way, the wrap-around buffer formed in memory 36 by the DMA controller is utilized by software operating processor 34 to extend the effective size of the FIFO buffer already existing in the UARTs of DUARTs 26, 28, and 30. This wrap-around buffer in memory 36, formed by the DMA controller operating in the FIFO buffer mode, provides for a variable transfer length as opposed to the fixed transfer length required when the DMA controller operates in the conventional DMA mode.

In the conventional mode of the DMA controller, software operating processor 34 must process one byte or one packet of data at a time or data may be lost because the DMA controller specifies only the initial destination memory address and a fixed transfer length. The FIFO buffer mode of the DMA controller allows the DMA controller to create the FIFO buffer in memory 36 which wraps around after the memory address is incremented a selected number of addresses above the initial memory address so that data will not be lost. While the DMA controller according to the present invention operating in the FIFO buffer mode preferably creates a FIFO buffer in memory 36, the wrap-around buffer does not necessarily have to be implemented as a true FIFO buffer. However, by implementing the wrap-around buffer as a true FIFO buffer, software operating processor 34 can extend the existing size of the typical 16 byte deep FIFO of a conventional UART to the preferred 256 bytes as illustrated and described above, or to any other preferred number of bytes, according to the present invention.

Although the present invention has been described with reference to preferred embodiments, workers skilled in the art will recognize that changes may be made in form and detail without departing from the spirit and scope of the invention.

What is claimed is:

1. A dual mode direct memory access (DMA) controller for controlling communication between a module bus, which communicates with a processor and a main memory, and an input/output (I/O) bus, which communicates with an external device, the DMA controller comprising:

a mode controller subsystem for providing a mode bit having a first state and a second state;

a data controller subsystem for receiving and selectively storing I/O bus input data from the I/O bus to provide module bus output data to the module bus, and for receiving and selectively storing module bus input data from the module bus to provide I/O bus output data to the I/O bus;

a device address controller subsystem for receiving and selectively storing a device address from the module bus to provide an I/O device output address to the I/O bus, the device address representing the external device;

a memory addressing subsystem for storing and providing a memory address to the module bus representative of a storage location in the main memory, the memory addressing subsystem receiving module bus input data to form an initial memory address, the memory addressing subsystem including an incrementer for repeatedly incrementing by at least one count the memory address from the initial memory address through a selected range of memory addresses representing a grouping of storage locations, the incrementing means being responsive to the mode bit being in a first state to increment an upper multiple bit portion from an overflow carry from a lower multiple bit portion, and blocking means for blocking the overflow carry from the lower multiple bit portion in response to the mode bit being in the second state to restart the memory address at the initial memory address after the incrementer has incremented the memory address a selected number of addresses above the initial memory address to cause the memory address to wrap around at the initial memory address to thereby form a wrap around buffer in the main memory;

a transfer counter for calculating and storing a transfer count representing the number of selected data groupings of the I/O bus output data written into the main memory from the module bus; and a detector for detecting when the transfer count stored in the transfer count storage means has reached a selected value to indicate that a normal DMA operation of storing module bus output data to main memory is complete in response to the mode bit being in the first state, and for detecting when the wrap-around buffer in the main memory is full based on transfer count signalling an error condition in response to the mode bit being in the second state.

2. The DMA controller of claim 1 wherein the I/O bus communicates with a universal asynchronous receiver/transmitter (UART) to receive data from and transmit data to a serial device, the UART providing translation between serial data provided by the serial device and parallel data provided by the I/O bus.

3. The DMA controller of claim 2 wherein the DMA controller controls a plurality of UARTs to receive data from and transmit data to a plurality of serial devices.

4. The DMA controller of claim 3 wherein the data controller subsystem, the device address controller subsystem, the transfer counter, the memory addressing subsystem, and the mode controller subsystem are implemented in a register file structure.

5. The DMA controller of claim 4 further comprising:

an arbitrator to select a serial device to match a channel which corresponds to a register file address.

6. The DMA controller of claim 1 wherein the data controller subsystem further includes packing means for packing I/O bus input data and module bus input data into words having at least two bytes in response to the mode bit being in the first state, and for holding a byte in response to the mode bit being in the second state.

7. The DMA controller of claim 1 wherein the wrap-around buffer formed in the main memory is utilized by software operating the processor as a first in first out (FIFO) buffer.

8. The DMA controller of claim 1 wherein the transfer counter includes means for modifying the transfer count based on a number of selected data groupings read from the wrap-around buffer in the main memory in response to the mode bit being in the second state.

9. The DMA controller of claim 1 wherein the detector detects when a selected amount of data is written in the wrap-around buffer in the main memory to indicate an interrupt condition in response to the mode bit being in the second state.

10. In a direct memory access (DMA) controller which controls communication between a module bus communicating with a processor and a main memory, and an input/output (I/O) bus communicating with an external device, the DMA controller including a data storage subsystem for receiving and selectively storing I/O bus input data from the I/O bus to provide module bus output data to the module bus, and for receiving and selectively storing module bus input data from the module bus to provide an I/O bus output data to the I/O bus; a device addressing subsystem for receiving and selectively storing a device address from the module bus to provide an I/O device output address to the I/O bus, the device address representing the external device; a memory address subsystem for storing and providing a memory address to the module bus representing a storage location in the main memory, the memory addressing subsystem receiving module bus input data to form an initial memory address and including an incrementer for repeatedly incrementing by at least one count the memory address from the initial memory address through a selected range of memory addresses representing a grouping of storage locations; a transfer counter for calculating and storing a transfer count representing a number of selected data groupings of the I/O bus output data written into the main memory from the module bus; and a detector for detecting when the transfer count stored in the transfer counter has reached a selected value to indicate that a DMA operation of storing module bus output data to main memory is complete, wherein the improvement comprises:

a mode controller subsystem for selectively placing the DMA controller in a normal mode or a buffer mode;

the incrementer being responsive to the DMA controller being in a normal state to increment an upper multiple bit portion from an overflow carry from a lower multiple bit portion;

first means responsive to the DMA controller being in the buffer mode to restart the memory address at the initial memory address after the incrementer has incremented the memory address a selected number of addresses above the initial memory address to cause the memory address to wrap-around at the initial memory address to thereby form a wrap-around buffer in the main memory; and second means responsive to the DMA controller being in the buffer mode to detect when the wrap-around buffer in the main memory is full based on the transfer count signalling an error condition.

11. The DMA controller of claim 10 wherein the I/O bus communicates with a universal asynchronous receiver/transmitter (UART) to receive data from and transmit data to a serial device, the UART providing translation between serial data provided by the serial device and parallel data provided by the I/O bus.

12. The DMA controller of claim 11 wherein the DMA controller controls a plurality of UARTs to receive data from and transmit data to a plurality of serial devices.

13. The DMA controller of claim 10 wherein the wrap-around buffer formed in the memory is utilized by software operating the processor as a first in first out (FIFO) buffer.

14. The DMA controller of claim 10 wherein the improvement further comprises means responsive to the DMA controller being in the buffer mode to modify the transfer count based on a number of selected data groupings read from the wrap-around buffer in the memory.

15. The DMA controller of claim 10 wherein the improvement further comprises means responsive to the DMA controller being in the buffer mode to detect when a selected amount of data is written in the wrap-around buffer in the main memory to indicate an interrupt condition.

16. A method for controlling communication between a module bus, which communicates with a processor and a main memory, and an input/output (I/O) bus, which communicates with an external device, the method comprising:

providing a mode bit having a first state and a second state;

receiving and selectively storing I/O bus input data from the I/O bus to provide module bus output data to the module bus;

receiving and selectively storing module bus input data from the module bus to provide I/O bus output data to the I/O bus;

receiving and selectively storing a device address from the module bus to provide an I/O device output address to the I/O bus, the device address representing the external device;

providing a memory address to the module bus representative of a storage location in the main memory by receiving module bus input data to form an initial memory address, and by repeatedly incrementing by at least one count the memory address from the initial memory address through a selected range of memory addresses representing a grouping of storage location, the memory address having an upper multiple bit portion that is incremented by an overflow carry from a lower multiple bit portion when the mode bit is in its first state;

responding to the mode bit being in the second state to restart the memory address at the initial memory address after the memory address has been incremented a selected number of addresses above the initial memory address to cause the memory address to wrap around at the initial memory address to thereby form a wrap-around buffer in the main memory:

calculating and storing a transfer count representing the number of selected data groupings of the I/O bus output data written into the main memory from the module bus;

detecting when the transfer count has reached a selected value to indicate that a normal operation of storing module bus output data to main memory is complete in response to the mode bit being in the first state; and detecting when the wrap-around buffer in the main memory is full based on the transfer count signalling an error condition in response to the mode bit being in the second state.

17. The method of claim 16 wherein the I/O bus communicates with a universal asynchronous receiver/transmitter (UART) to receive data from and transmit data to a serial device, the UART providing translation between serial data provided by the serial device and parallel data provided by the I/O bus.

18. The method of claim 17 wherein the method controls a plurality of UARTs to receive data from and transmit data to a plurality of serial devices.

19. The method of claim 16 further comprising the steps of packing I/O bus input data and module bus input data into words having at least two bytes in response to the mode bit being in the first state, and holding a byte in response to the mode bit being in the second state.

20. The method of claim 16 wherein the wrap-around buffer formed in the main memory is utilized by software operating the processor as a first in first out (FIFO) buffer.

21. The method of claim 16 further comprising the step of modifying the transfer count based on a number of selected data groupings read from the wrap-around buffer in the main memory in response to the mode bit being in the second state.

22. The method of claim 16 further comprising the step of detecting when a selected amount of data is written in the wrap-around buffer in the main memory to indicate an interrupt condition in response to the mode bit being in the second state.

* * * * *

UNITED STATES PATENT AND TRADEMARK OFFICE
CERTIFICATE OF CORRECTION

PATENT NO. : 5,608,889

DATED : March 4, 1997

INVENTOR(S) : LARRY M. WERLINGER, JAMES A. DAHLBERG, KERMIT E. FRYE

It is certified that error appears in the above-indentified patent and that said Letters Patent is hereby corrected as shown below:

In the Title Page, delete "DNA", insert --DMA--

Col. 2, line 24, delete "processor s", insert --processor's--

Col. 3, line 6, delete "tom", insert --from--

Col. 5, line 35, delete "In-addition", insert --In addition--

Col. 7, line 38, delete "$DMA_{13}DONE$", insert --DMA_DONE--

Col. 7, line 54, delete "$DMA_{13}DONE$", insert --DMA_DONE--

Col. 17, line 33, delete "$DMA_{13}DONE$", insert --DMA_DONE--

Col. 17, line 63, delete "$DMA_{13}DONE$", insert --DMA_DONE--

Col. 19, line 20, delete "203 B", insert --203B--

Col. 19, line 64, delete "Operating", insert --operating--

UNITED STATES PATENT AND TRADEMARK OFFICE
CERTIFICATE OF CORRECTION

PATENT NO. : 5,608,889

DATED : March 4, 1997

INVENTOR(S) : LARRY M. WERLINGER, JAMES A. DAHLBERG, KERMIT E. FRYE

It is certified that error appears in the above-indentified patent and that said Letters Patent is hereby corrected as shown below:

Col. 19, line 65, before "mode", delete "0"

Signed and Sealed this

Twenty-first Day of October 1997

Attest:

BRUCE LEHMAN

Attesting Officer

Commissioner of Patents and Trademarks